Patented June 18, 1935

2,005,365

UNITED STATES PATENT OFFICE 2,005,365

MUSHROOM SPAWN

Rosario Di Giacinto, Toughkenamon, Pa.

No Drawing. Application January 29, 1935,
Serial No. 3,995

6 Claims. (Cl. 47—1)

The invention relates to a mushroom spawn in the form of pellets.

It can be made in any size and any form such as round, square, prismatic or conical. The manure must be real fine like flour and must be very old. Any kind of animal manure is good, mixed or not with all kinds of grains, old sawdust, decayed straw, rotted wood, all kinds of decayed grass and leaves. The mixture is then made into pellets which are put into bottles and sterilized.

The manure must be sterilized for five to six hours, at 240 to 360 degrees, then it must be cooled off, when cool it is ready to be germinated with mushroom culture. After germination it should be put in a warm place at a temperature of 70 to 75 degrees, for thirty days, then it is ready to plant.

It can be grown in any kind of bottle or glass container thus it can be taken out without breaking the bottle, or container. It is preferable to form the spawn in the form of pellets, as in this form it can be poured out and easily removed from the container.

A bed seventy feet long and six feet wide can be supplied by four quarts, whereas with the ordinary form of commercial spawn it would take about fifteen quarts. Thus a saving of both germination and amount of spawn is made by my invention. It is animal proof and not subject to green mold.

The material may be formed into pellets by pressure, as in a pill press; or by running through a sausage grinder; or in any other suitable manner. The pellets are formed before sterilizing. No poison, repellent or other animal proofing ingredient is added. Any of the ingredients may be used dry, wet, damp or moist, but I prefer to use them dry. Temperatures mentioned are Fahrenheit. The sterilizing is preferably done by superheated steam, using a high pressure boiler with 15 to 20 pounds pressure. Experience shows that this sterilizing does not cause the mixture to burn or to turn into charcoal.

What I claim as my invention is:

1. Mushroom spawn in the form of pressed pellets or their equivalents.

2. A mushroom spawn which is not subject to green mold and is in pressed pellet form.

3. A mushroom spawn that is animal proof and in pressed pellet form.

4. The method of making mushroom spawn, which comprises: preparing very old manure in a very fine flour-like condition; mixing the manure with one or more of the materials of the group including grain, old sawdust, decayed straw, rotted wood, decayed grass and leaves; sterilizing such mixture five to six hours at 240 to 360 degrees, then cooling it sufficiently for inoculation; inoculating with mushroom culture, and keeping such inoculated mixture at a temperature of 70 to 75 degrees for thirty days.

5. Spawn made as in claim 4, and formed into pellets.

6. Spawn made as in claim 4, which is animal-proof and resistant to green mold.

ROSARIO his X mark DI GIACINTO.

Witness to mark:
CHRISTINA DI GIACINTO.